United States Patent Office 3,060,697
Patented Oct. 30, 1962

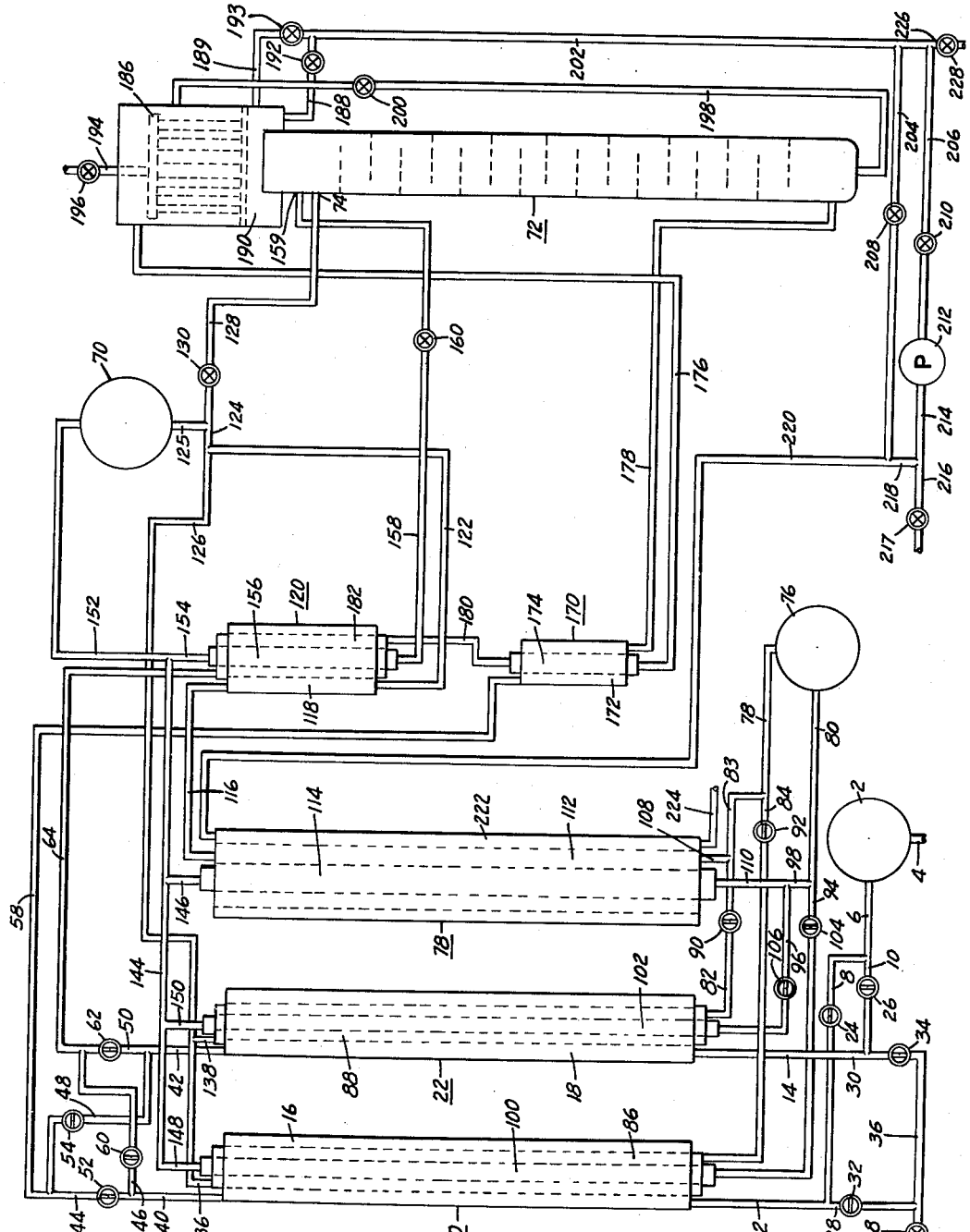

3,060,697
APPARATUS FOR AND METHOD OF
SEPARATING GASES
Samuel C. Collins, Watertown, Mass., assignor to Joy
Manufacturing Company, Pittsburgh, Pa., a corporation of Pennsylvania
Filed Nov. 14, 1957, Ser. No. 696,522
17 Claims. (Cl. 62—13)

This invention relates to the separation of gases and more particularly to the separation of air to provide at least one component thereof as a substantially pure product. The invention has both method and apparatus aspects.

In the separation of a mixture of gases and particularly in the separation of air wherein rectification is effected at temperatures far below those at which condensation of water and carbon dioxide take place, it is desirable to remove these higher boiling point impurities before the air is directed to the rectification column. Reversing heat exchangers have found widespread use in the removal of these higher boiling point impurities. In these exchangers an entering air stream, where the mixture of gases to be separated is air, and a leaving product of rectification, generally the effluent waste gases, are passed through separate passages in counterflow heat exchange relation to each other for a short period and then the flows of the entering air stream and the effluent stream are changed so that the streams exchange passages, and this alternation of flows is continuously repeated. During its flow through the heat exchanger passage the temperature of the air is lowered so as to remove substantially all of the higher boiling point impurities, water vapor and carbon dioxide, and during the next ensuing passage of effluent waste gases these impurities are removed and directed from the system. Much difficulty has been encountered with such reversing heat exchangers, both in completely depositing these higher boiling point impurities out of the air stream and also in effecting complete removal of the impurities from the heat exchanger by the effluent stream.

It is a primary object of the present invention to provide a novel and improved apparatus and method for separating gases. It is a further object of the invention to provide such an apparatus and method for completely depositing out of an entering air stream the higher boiling point impurities and for completely removing these impurities on the next subsequent flow of effluent gases through the passage previously traversed by the air stream.

In a preferred form of the present invention which will be described in connection with the separation of air although it will be understood that the invention would be applicable to the separation of other mixtures of gases, two heat exchangers having three separate courses are used. An entering air stream en route to a rectification column flows alternately through a passage in the first heat exchanger and a passage in the second heat exchanger, while an effluent waste gas stream alternately flows from the rectification column through the same passages in the first and second heat exchangers not then traversed by the air stream. A refrigeration cycle, the refrigerant of which may be completely separate from the remainder of the system or may be made up of a stream rich in nitrogen withdrawn from the rectification column, supplies all of the refrigeration for the system. The refrigeration cycle basically includes an expansion engine wherein the pressure and temperature of the refrigerant are substantially reduced and a compressor wherein the pressure and temperature of the refrigerant are substantially increased. A further heat exchanger through which the cold low pressure refrigerant flows in countercurrent heat exchange relation with the warmer high pressure refrigerant connects the expansion engine with the compressor. A portion of the cold refrigerant from the expansion engine is bled off and passed alternately through one of the passages in the first or second heat exchanger in heat exchange relation with the incoming air stream, while a portion of the warmer high pressure refrigerant is bled off and alternately passed through the remaining passage in the first or second heat exchanger in countercurrent heat exchange relation with the effluent waste gas stream. As aforementioned, the flow of air and effluent waste gases are periodically changed so that these streams exchange passages, say on the order of once each hour, and the flow of the bled off cold low pressure and warmer high pressure refrigerant are also periodically changed to flow as aforementioned, with the result that the temperature of the entering air stream is sufficiently reduced to effect substantially complete solidification of the water and carbon dioxide impurities in the heat exchanger course, and on the next ensuing passage through that course the effluent waste gas stream is heated to a sufficiently high temperature to readily effect complete removal of the water and carbon dioxide impurities.

In a preferred embodiment of the invention a portion of the high pressure nitrogen is passed through a further heat exchanger in heat exchange relation with the effluent waste gas stream and a portion of the cold lower pressure nitrogen from the expansion engine to thereby liquefy the high pressure nitrogen. In one embodiment of the invention the liquid nitrogen with its pressure reduced to substantially that of column pressure is directed into the rectification column, while in a second embodiment of the invention the liquid nitrogen is directed in heat exchange relation with the purified air stream to liquefy a substantial portion of the latter, say on the order of 25%, prior to its flow into the rectification column. The liquid nitrogen is evaporated and flows back into the refrigeration cycle.

While there has been set forth above several objects and a brief summary of the invention, it will be appreciated that other objects and advantages of the invention can be observed in the following more detailed description of the invention when read in conjunction with the drawings in which:

The drawing represents a schematic view of one embodiment of the present invention as applied to an apparatus for producing nitrogen.

Referring first to the system shown in FIGURE 1, an air compressor of a conventional type having constant drive and designated 2 has an intake 4 and a discharge 6. Conduits 8 and 10 connect discharge conduit 6 with further conduits 12 and 14 which in turn connect with one end of courses 16 and 18 respectively in heat exchangers designated generally 20 and 22. A pair of reversing valves 24 and 26 are positioned in conduits 8 and 10 respectively and may be periodically reversed in a well known manner to direct the flow of air from compressor 2 either into heat exchanger course 16 or 18. A further pair of conduits 28 and 30 also connect respectively with conduits 12 and 14 and have positioned therein a second pair of reversing valves 32 and 34. Reversing valves 32 and 34 also can periodically be reversed in a conventional manner to direct effluent gases from the heat exchanger courses 16 and 18, as will be further described later, into a common conduit 36 which is open to the atmosphere. A valve 38 may be placed adjacent the open end of conduit 36 to control the outward flow of the waste gas stream as also will be described in more detail hereinafter.

Conduits 40 and 42 connect the other end of heat exchanger courses 16 and 18 respectively with further pairs of conduits 44, 46 and 48, 50. Reversing valves 52 and 54 are positioned in conduits 44 and 48 respectively and the opening and closing of these valves can also periodically be controlled in a conventional way to permit air from one or the other of heat exchangers 16 and 18 to flow into a further conduit 58 which joins with conduits 44 and 48. A further pair of reversing valves 60 and 62 are positioned in conduits 46 and 50 respectively and can also periodically be controlled in a conventional way to permit effluent waste gases to flow from a conduit 64 which joins conduits 46 and 50, through the latter conduits, as will be described more in detail hereinafter.

Refrigeration for the system is supplied by means of an expansion engine 70 which may be of a well known type such as shown in my Patent No. 2,607,322 and in which the temperature and pressure of the gas is substantially reduced. In the embodiment of the invention shown in FIGURE 1 the refrigerant to be expanded in the expansion engine is a nitrogen-rich stream, the make up for which is withdrawn from the rectification column 72 at 74. The refrigeration cycle also includes a compressor 76 and a further heat exchanger designated generally 78. Compressor 76 is of a conventional type and desirably has two stages with an intake 79 and a discharge 80. End to end conduits 82, 83 and a further conduit 84 connect the compressor discharge 78 with courses 86 and 88 in heat exchangers 20 and 22 respectively. A pair of valves 90 and 92 positioned in conduits 82 and 84 respectively may periodically be operated in a conventional manner to control the flow of cold low pressure refrigerant through heat exchanger courses 86 and 88, as will be developed more fully hereinafter. A further pair of conduits 94 and 96, the latter through a further conduit 98, connect the compressor discharge 80 with courses 100 and 102 in heat exchangers 20 and 22 respectively. A further pair of valves 104 and 106 are positioned in conduits 94 and 96 respectively and may be periodically operated in a known manner to control the flow of a portion of the warmer high pressure refrigerant from the compressor 76 into heat exchanger courses 100 and 102, as will also be more fully developed hereinafter.

Further conduits 108 and 110 connect respectively through conduits 83 and 98, courses 112 and 114 of heat exchanger 78 with the intake and discharge respectively of the compressor 76. Conduit 116 connects the other end of heat exchanger course 112 with a course 118 in a further heat exchanger designated generally 120, while conduit 122 connects the other end of heat exchanger course 118 to a conduit 124, the latter in turn connecting with a discharge conduit 125 of the expansion engine and a conduit 128 extending from the rectification column 72. A valve 130 is desirably placed in line 128 for regulating the pressure of the nitrogen-rich refrigerant gas flowing from the column through 128 as will be more fully developed hereinafter. A conduit 126 also connects conduit 124 with heat exchanger passages 86 and 88 of heat exchangers 20 and 22 respectively through further conduits 136 and 138. Courses 100, 102 and 114 of heat exchangers 20, 22 and 78 respectively connect with a common conduit 144 through conduits 148, 150 and 146.

A stream of high pressure nitrogen flowing through conduit 144 is split with a first portion flowing through a conduit 152 into the expansion engine 70 and a second portion through a conduit 154 into a further course 156 in heat exchanger 120. The discharge end of heat exchanger course 156 is connected through a conduit 158 with the rectification column 72 at 159. A valve 160 of a conventional type is positioned in line 158 to throttle or reduce the pressure of the liquid nitrogen flowing therethrough so that it enters the rectification column at 159 at substantially the same pressure as exists at that point in the column.

A further heat exchanger 170 is provided having courses 172 and 174 through which flow respectively the incoming air stream from conduit 58 and the effluent waste gas stream from a conduit 176 which connects with the upper end of the column. Subsequent to its passage through course 172 the air stream flows through a further conduit 178 and into the lower end of the rectification column 72 while subsequent to the flow of the effluent waste gas stream through heat exchanger course 174 it flows through a conduit 180 into a further course 182 in heat exchanger 120, thence into conduit 64.

The rectification column 72 shown as a single column is of a conventional type having a nitrogen condenser 186 and a nitrogen product discharge conduit 188 connected with the column. Conduit 188 desirably has a valve 192 to control the flow of product liquid nitrogen from the system. As nitrogen either in liquid or gaseous form may be produced with the system disclosed in FIGURE 1, a further conduit 189, having a valve 193 positioned therein through which gaseous nitrogen product may flow, connects with the column above the connection of conduit 188. A conduit 194 having a valve 196 therein connects the top of the condenser 186 with the atmosphere and permits the escape of rare gases. A further conduit 198 connects the lower portion of the column to a point adjacent the condenser and carries a liquid mixture of the components of air. A valve 200 is positioned in this line to throttle or reduce the pressure of the liquid mixture to that then obtaining in the upper portion of the column.

A conduit 202 connects conduits 188 and 189 downstream from valves 192 and 193 respectively with pairs of conduits 204 and 206. Stop valves 208 and 210 are positioned in conduits 204 and 206 with the latter conduit connecting with a pump 212. A further conduit 214 connects the discharge side of pump 212 with a pair of conduits 216 and 218, the later conduit also connecting with conduit 204. A stop valve 217 is desirably positioned in conduit 216. A conduit 220 connects conduits 204 and 218 with a further course 222 in heat exchanger 78, the downstream end of course 222 connecting with a conduit 224. A further conduit 226 having a stop valve 228 therein connects with conduit 202 at the juncture with conduit 206.

Low pressure liquid nitrogen can thus be withdrawn from the system through conduits 188, 202 and 226 and valve 228, while high pressure liquid nitrogen can be withdrawn from the system through conduits 188, 202, 206, valve 210, pump 212, conduits 214 and 216 and valve 217. When low pressure gaseous nitrogen is the desired product valve 193 can be opened (valve 192 closed) to allow gaseous nitrogen to flow through conduits 189, 202, 204 and 220 into heat exchanger course 222 and out of the system through conduit 224. High pressure gaseous nitrogen can be produced by opening valves 192 and 210 and closing valves 193, 208 and 217 to thus effect the pumping of high pressure nitrogen through conduits 214, 218 and 220 into heat exchanger course 222 wherein the liquid high pressure nitrogen stream is gasified and thence from the system through conduit 224.

*Operation of System in Figure 1*

With the pairs of valves 24, 26; 52, 54; 32, 34; 60, 62; 90, 92 and 104, 106 positioned as shown in FIG. 1, air which is compressed to about 75 p.s.i.g. flows from compressor 2 through the conduits 6 and 8, valve 24 and conduit 12 into the course 16 of heat exchanger 20. At the same time the effluent waste gas stream which flows from the top of the column through the conduit 176, course 174 in heat exchanger 170, conduit 180, course 182 in heat exchanger 120 and conduit 64 flows through the open valve 62 and conduits 50 and 42 into course 18 of heat exchanger 22. During this phase of the cycle a cold gaseous stream of nitrogen-rich refrigerant which is made up in part from a gaseous nitrogen stream flowing from the column through conduit 128 and from the expansion engine 70 through conduit 125, flows through the conduit 126 and by reason of the valve 92 being in its open position through course 86 in heat exchanger 20. Since valve 90 is in its closed position there will of course be now flow of low pressure nitrogen refrigerant through heat exchanger 22.

The setting of valves 92 and 90 can initially be adjusted to regulate the amount of cold low pressure nitrogen flowing through heat exchangers 20 and 22 and under normal operating conditions approximately one-fourth of the available low pressure nitrogen will flow through heat exchangers 20 or 22 with the remainder of such nitrogen flowing through conduit 122, course 118 of heat exchanger 120, conduit 116, course 112 in heat exchanger 78, and conduit 108 finally to be joined with the low pressure nitrogen flowing from heat exchangers 20 or 22 through conduits 84 or 82.

The temperature of the inner walls of heat exchanger course 16 through which the entering air stream flows adjacent the downstream end thereof, by reason of its heat exchange with the substantially colder nitrogen stream flowing through course 86, will be reduced to on the order of 103° K. The temperature of the entering air stream will likewise be reduced to within a few degrees of the temperature of the exchanger walls and since this temperature is substantially below the condensation points of water and carbon dioxide these impurities are solidified out of the air stream and deposited on the walls of heat exchanger course 16.

The cold low pressure nitrogen flowing from conduits 83 and 84 enters the compressor 76 through the intake conduit 78 and is discharged through the conduit 80 at a substantially higher pressure. When a multipurpose plant is used as disclosed herein and a liquid is being produced as the end product, the pressure of the refrigerant leaving compressor 76 will be on the order of 700 p.s.i.g. When a high pressure gaseous product is being produced, the pressure at the discharge end of compressor 76 will be on the order of 550 p.s.i.g. and when a low pressure gaseous product is produced about 300 p.s.i.g. With valve 104 closed and valve 106 in its open position a portion of the warm refrigerant flows from the conduit 80 through conduits 98 and 96 into course 102 of heat exchanger 22 wherein it flows in countercurrent heat exchange relation with the effluent waste gases flowing through course 18. The setting of valves 106 and 104 can be regulated initially to allow that mass of warmed refrigerant to flow through heat exchagers 22 or 20 to sufficiently raise the temperature of the heat exchanger walls through which the outgoing effluent gases flow above the sublimation point of carbon dioxide and water vapor to thereby effect complete sublimation of these impurities previously deposited out of the compressed air stream onto the walls of the heat exchanger course into the waste gas stream then flowing through heat exchanger 22 or 20. With the setting of the valves shown in FIG. 1 the waste gases flow from course 18 of heat exchanger 22 through conduit 14, open valve 34, conduit 36, and valve 38 to the atmosphere.

In the preferred operation of the system of FIGURE 1 the opening and closing of the pairs of valves 24, 26; 52, 54; 60, 62 and 32, 34 takes place on the order of about once every hour, with the result that incoming air and outgoing effluent waste gases exchange courses 16 and 18 once an hour. Likewise, the opening and closing of pairs of valves 90, 92 and 104, 106 takes place once each hour. However, since the warm high pressure nitrogen has heated the heat exchanger 20 or 22 through which the effluent waste gases are flowing to a temperature greater than that required for normal operation, it is desirable to close whichever one of valves 104 or 106 that is open about five minutes before the air and effluent control valves are reversed and also to open whichever one of valves 90 or 92 which is closed about five minutes before the reversing of the air and effluent control valves. The reversing of pairs of valves 104, 106 and 90, 92 as aforementioned can be time controlled in a conventional manner, and with the timing of their opening and closing as described above it will be seen that cold low pressure nitrogen flows for a period of about five minutes through both courses 86 and 88 in heat exchangers 20 and 22 just previous to the exchanging of the flows of air and effluent waste gases and during this same five minute interval all of the warmer compressed refrigerant flows through the heat exchanger 78 with no flow through heat exchanger 20 or 22. The heat exchanger course next to be traversed by the entering air stream is thus cooled at all points to substantially those tempertures which subsist after the flow of compressed air is reestablished therethrough. After this five minute cooling period the flows of air and waste gases are changed from one of heat exchangers 20 and 22 to the other to thereby complete the cycle.

The purified air stream flows from heat exchangers 20 or 22 through conduit 58 into course 172 of heat exchanger 170 where it flows in countercurrent heat exchange relation with the effluent waste stream flowing through heat exchanger course 174. A portion of the purified air, probably on the order of 1 to 5%, is liquefied in the heat exchanger and the combined liquid and gaseous air is then directed through conduit 178 into the lower end of column 72. At the same time the high pressure refrigerant flowing from heat exchangers 20 or 22 is united in conduit 144 with the high pressure nitrogen flowing through course 114 of heat exchanger 78 with the united stream being split, a part flowing into the expansion engine through conduit 152 and the remainder flowing through conduit 154 into course 156 of heat exchanger 120. When a liquid product is being produced about 13 to 15% of the refrigerant flowing through line 144 flows through heat exchanger 120, while in the case of a high pressure gaseous product about 9 to 10% is put through course 156 of heat exchanger 120 and in the case of a low pressure product about 5%. The nitrogen flowing through this latter heat exchanger in heat exchange with a portion of the cold low pressure nitrogen flowing through course 118 and a colder effluent gas flowing through course 182 is substantially completely liquefied. The cold liquid nitrogen flows through conduit 158 and valve 160 wherein its pressure is reduced to substantially that in the upper portion of the column and is then directed into the column at 159. It can be seen from the above description that all of the refrigeration for the column is supplied primarily through the liquid nitrogen and the mixture of liquid and gaseous air entering the column. Nitrogen product, as aforementioned, is withdrawn from the system through conduits 188 or 189.

In a single service plant an operating pressure of 700 p.s.i.g. is contemplated with the present invention and the dimensions of the refrigerating apparatus, of the compressor 76, heat exchanger 78 and the expansion engine 70 are adjusted to give the required refrigeration with an expansion ratio of 700 p.s.i.g. to about 73 p.s.i.g. Variation in the amount of refrigeration required in the system can readily be controlled by regulating valves 130 and 38. When less refrigeration is required, valve 130 can be partially closed to reduce the pressure of the makeup nitrogen-rich stream entering the refrigeration cycle and after the system has been operated for a short period the system will be in equilibrium, so to speak, with the pressure of the refrigerant leaving the expansion engine being at substantially the same pressure as that flowing through valve 130. For example, under normal operating conditions the pressure flowing into conduit 128 from the column may be on the order of 75 p.s.i.g. and, if less refrigeration than would be obtained at this pressure is required, valve 130 can be partially closed to lower the pressure of the gaseous stream entering the refrigeration cycle through conduit 124. At the same time, if more refrigeration is necessary than can be produced with the valve 130 wide open, valve 38 in the waste gas line can be partially closed to increase the pressure, this resulting in an increase in temperature in the column adjacent the outlet point 74. The increase in temperature in the column is attended by an increase in the pressure of the gaseous nitrogen flowing through 128 into the refrigeration cycle, with the result that more refrigeration is produced.

While there has been disclosed and described above several specific embodiment of the present invention, it will be appreciated that the invention may be practiced with other slight modifications without departing from the spirit or scope of the invention as set forth in the appended claims.

I claim:

1. A method of separating at least one component from a mixture of gases comprising, passing a stream of a mixture of gases containing a desired gaseous component in heat exchange relationship in a heat exchange means with a second stream which second stream has a mass flow and a temperature of such magnitude to reduce the temperature of said mixture so that at least one gaseous component of said mixture is transformed in state with at least a portion of said transformed component remaining within said heat exchange means and with said desired component remaining in a gaseous state, subsequently discontinuing said mixture flow and said second stream flow and passing a third stream in heat exchange relationship with a fourth stream in said heat exchange means with said fourth stream having a mass flow and temperature of such magnitude so that said third stream is at a temperature in conjunction with the mass flow thereof so that substantially all of said transformed component in said heat exchange means is removed from said heat exchange means, subsequently discontinuing said fourth stream flow, and subsequently discontinuing said third stream flow in said heat exchange means whereby said heat exchanger is conditioned to allow the reinstatement of the initially specified flows of said mixture and said second stream.

2. A method of separating at least one component from a mixture of gases comprising, passing a stream of a mixture of gases containing a desired gaseous component in heat exchange relationship in a heat exchange means with a second stream which second stream has a mass flow and a temperature of such magnitude to reduce the temperature of said mixture so that at least one gaseous component of said mixture is transformed in state with substantially all of said transformed component remaining within said heat exchange means and with said desired component remaining in a gaseous state, subsequently discontinuing said mixture flow and said second stream flow and passing a third stream in heat exchange relationship with a fourth stream in said heat exchange means with said fourth stream having a mass flow and temperature of such magnitude so that said third stream is at a temperature in conjunction with the mass flow thereof so that substantially all of said transformed component in said heat exchange means is again transformed in state and removed from said heat exchange means, subsquently discontinuing said fourth stream flow, and subsequently discontinuing said third stream flow in said heat exchange means whereby said heat exchanger is conditioned to allow the reinstatement of the initially specified flows of said mixture and said second stream.

3. A method of separating at least one component from a mixture of gases comprising, passing a stream of a mixture of gases containing a desired gaseous component in heat exchange relationship in a heat exchange means with a second stream which second stream has a mass flow and a temperature of such magnitude to reduce the temperature of said mixture so that at least one gaseous component of said mixture is transformed in state with at least a portion of said transformed component remaining within said heat exchange means and with said desired component remaining in a gaseous state, subsequently substantially simultaneously discontinuing said mixture flow and said second stream flow and substantially simultaneously passing a third stream in heat exchange relationship with a fourth stream in said heat exchange means with said fourth stream having a mass flow and temperature of such magnitude so that said third stream is at a temperature in conjunction with the mass flow thereof so that substantially all of said transformed component in said heat exchange means is removed from said heat exchange means, subsequently discontinuing said fourth stream flow and reestablishing said second stream flow in said heat exchange means, and subsequently discontinuing said third stream flow in said heat exchange means and reestablishing said mixture flow in said heat exchange means.

4. The method as specified in claim 3 in which said second stream flow is reestablished prior to the reestablishing of said mixture flow for a period of not greater than approximately one twelfth ($\frac{1}{12}$) the total period of time said mixture and said second stream flow through said heat exchange means.

5. The method as specified in claim 1 in which said mixture and said third stream sequentially flow in one passageway in said heat exchange means and said second and fourth streams flow in independent paths in said heat exchange means.

6. In a method of rectifying air to provide at least one component thereof as a substantially pure product, the cycle of steps of first cooling a first stream of raw compressed air by passing it for a period through a first passage in a first heat exchange zone in countercurrent heat exchange relation with a cold second fluid stream flowing in a second passage in said heat exchange zone to reduce the temperature of said compressed air to accomplish substantially complete solidification and deposition of the carbon dioxide out of said compressed air stream, subsequently interrupting the flows of said first and second streams through said first heat exchange zone and establishing countercurrent flow of said first and second streams through a first and second passage in a second heat exchange zone to reduce the temperature of said compressed air stream then flowing through said second heat exchange zone to accomplish substantially complete solidification and deposition of the carbon dioxide out of said compressed air stream and simultaneously therewith passing a cold third stream containing at least one component of air through said first passage in said first heat exchange zone in a direction opposite to that previously followed by the compressed air stream in countercurrent heat exchange with a warm fourth fluid stream flowing in a third passage in said first heat exchange zone, said fourth stream being of such magnitude to gradually raise the temperature within said first passage of said first heat exchange zone to effect complete sublimation into said third stream of the carbon dioxide impurity previously removed from said compressed air stream flowing through said first heat exchange zone, subsequently interrupting the flow of said fourth stream through said third passage and reestablishing the flow of the cold second fluid stream in said second passage of said first heat exchange zone while maintaining flow of said second fluid stream through said second passage in said second heat exchange zone and subsequently interrupting the flow of said first stream through said second heat exchange zone and reestablishing the flow of said first stream of raw compressed air through said first passage of said first heat exchange zone.

7. In a method of rectifying air, the cycle of steps of first cooling a first stream of raw compressed air en route to a rectification zone wherein one component of the air is withdrawn as a substantially pure product, by passing it for a period through a first passage in a first heat exchange zone in countercurrent heat exchange relation with a cold second fluid stream containing at least one component of air flowing in a second passage in said heat exchange zone to reduce the temperature of said compressed air stream to accomplish substantially complete solidification and deposition of the carbon dioxide out of said compressed air stream, subsequently substantially simultaneously interrupting the flows of said first and second streams and simultaneously passing for a period a cold third stream containing at least one component of air through said first passage in said first heat exchange zone in a direction opposite to that previously followed by the compressed air stream in countercurrent heat exchange with a warm fourth fluid stream flowing in a third passage in said first heat exchange zone with said fourth stream being of such magnitude as to gradually raise the temperature within said first passage of said first heat exchange zone to effect complete sublimation into said third stream of the carbon dioxide impurity previously removed from said compressed air stream, subsequently interrupting the flow of said fourth stream through said third passage and reestablishing the flow of the cold second fluid stream in said second passage to reduce the temperature at every point along said first passage to its original value during said first period, and subsequently interrupting the flow of the third stream in said first passage and reestablishing a flow of said first stream of raw compressed air in said first passage in countercurrent heat exchange relation with the cold second stream then flowing through said second passage.

8. A method of separating a mixture of gases to provide at least one constituent of said mixture as a substantially pure product including the steps of, cooling a first stream of a mixture of gases by passing it through a first passage in a heat exchange zone in countercurrent heat exchange relation with a cold second fluid stream flowing in a second passage of said heat exchange zone to reduce the temperature of said mixture of gases to accomplish substantially complete solidification and deposition of the higher boiling point impurities out of the gaseous mixture, subsequently after a first period of time discontinuing the flows of said first and second streams and passing a third fluid stream through said first passage in said heat exchange zone in a direction opposite to that previously followed by said gaseous mixture and establishing the flow of a warm fourth fluid stream through said heat exchange zone in a direction countercurrent to said third fluid stream, said fourth stream being of such magnitude as to gradually raise the temperature within said first passage of said heat exchange zone to effect complete removal into said third stream of the higher boiling point impurities previously removed from said gaseous mixture, subsequently after a second period of time interrupting the flow of said fourth stream through said heat exchange zone while continuing to pass said third stream through said first heat exchange zone passage.

9. A continuous method of separating at least one component from a mixture of gases comprising, passing a stream of a mixture of gases containing a desired gaseous component in heat exchange relationship in one portion of a heat exchange means with a second stream which second stream has a mass flow and a temperature of such magnitude to reduce the temperature of said mixture so that at least one gaseous component of said mixture is transformed in state with at least a portion of said transformed component remaining within said one portion of said heat exchange means and with said desired component remaining in a gaseous state, subsequently discontinuing said mixture flow and said second stream flow and reestablishing such flows in a second portion of said heat exchange means and passing a third stream in heat exchange relationship with a fourth stream in said one portion of said heat exchange means with said fourth stream having a mass flow and temperature of such magnitude so that said third stream is at a temperature in conjunction with the mass flow thereof so that substantially all of said transformed component in said one portion of said heat exchange means is removed from said one portion of said heat exchange means, subsequently discontinuing said fourth stream flow in said one portion of said heat exchange means, and subsequently discontinuing said third stream flow in said one portion of said heat exchange means and reestablishing the initially specified flows of said mixture and said second stream in said one portion of said heat exchange means and establishing the specified flows of said third and fourth streams in said second portion of said heat exchange means.

10. A continuous method of separating at least one component from a mixture of gases comprising, passing a stream of a mixture of gases containing a desired gaseous component in heat exchange relationship in one portion of a heat exchange means with a second stream which second stream has a mass flow and a temperature of such magnitude to reduce the temperature of said mixture so that at least one gaseous component of said mixture is transformed in state with at least a portion of said transformed component remaining within said one portion of said heat exchange means and with said desired component remaining in a gaseous state, subsequently substantially simultaneously discontinuing said mixture flow and said second stream flow and reestablishing such flows in a second portion of said heat exchange means and substantially simultaneously passing a third stream in heat exchange relationship with a fourth stream in said one portion of said heat exchange means with said fourth stream having a mass flow and temperature of such magnitude so that said third stream is at a temperature in conjunction with the mass flow thereof so that substantially all of said transformed component in said one portion of said heat exchange means is removed from said one portion of said heat exchange means, subsequently discontinuing said fourth stream flow in said one portion of said heat exchange means and reestablishing said second stream flow in said one portion of said heat exchange means, and subsequently discontinuing said third stream flow in said one portion of said heat exchange means and reestablishing said mixture flow in said one portion of said heat exchange means in heat exchange relationship with said previously reestablished second stream flow and establishing the specified flows of said third and fourth streams in said second portion of said heat exchange means.

11. A continuous method of separating at least one component from a mixture of gases comprising, passing a stream of a mixture of gases containing a desired gaseous component in heat exchange relationship in one portion of a heat exchange means with a first portion of a second stream which first portion of said second stream has a mass flow and a temperature of such magnitude to reduce the temperature of said mixture so that at least one gaseous component of said mixture is transformed in state with at least a portion of said transformed component remaining within said one portion of said heat exchange means and with said desired component remaining in a gaseous state, subsequently discontinuing said mixture flow and said first portion of said second stream flow and reestablishing such flows in a second portion of said heat exchange means and passing a third stream in heat exchange relationship with a first portion of a fourth stream in said one portion of said heat exchange means with said first portion of said fourth stream having a mass flow and temperature of such magnitude so that said third stream is at a temperature in conjunction with the mass flow thereof so that substantially all of said other components in said one portion of said heat exchange means is removed from said one portion of said heat exchange means, subsequently discontinuing said first portion of said fourth stream flow in said one portion of said heat exchange means, subsequently discontinuing said third stream flow in said one portion of said heat exchange means and reestablishing the initially specified flows of said mixture and said first portion of said second stream in said one portion of said heat exchange means and establishing the specified flows of said third and said first portion of said fourth streams in said second portion of said heat exchange means, and continuously passing a second portion of said second stream in heat exchange relationship with a second portion of said fourth stream in a third portion of said heat exchange means.

12. A continuous method of separating at least one component from a mixture of gases comprising, passing a stream of a mixture of gases containing a desired gaseous component in heat exchange relationship in one portion of a heat exchange means with a first portion of a second stream which first portion of said second stream has a mass flow and a temperature of such magnitude to reduce the temperature of said mixture so that at least one gaseous component of said mixture is transformed in state with at least a portion of said transformed component remaining within said one portion of said heat exchange means and with said desired component remaining in a gaseous state, subsequently substantially simultaneously discontinuing said mixture flow and said first portion of said second stream flow and reestablishing such flows in a second portion of said heat exchange means and substantially simultaneously passing a third stream in heat exchange relationship with a first portion of a fourth stream in said one portion of said heat exchange means with said first portion of said fourth stream having a mass flow and temperature of such magnitude so that said third stream is at a temperature in conjunction with the mass flow thereof so that substantially all of said other components in said one portion of said heat exchange means is removed from said one portion of said heat exchange means, subsequently discontinuing said first portion of said fourth stream flow in said one portion of said heat exchange means and reestablishing said first portion of said second stream flow in said one portion of said heat exchange means, subsequently discontinuing said third stream flow in said one portion of said heat exchange means and reestablishing said mixture flow in said one portion of said heat exchange means in heat exchange relationship with said previously reestablished said first portion of said second stream flow and establishing the specified flows of said third and said first portion of said fourth streams in said second portion of said heat exchange means, and continuously passing a second portion of said second stream in heat exchange relationship with a second portion of said fourth stream in a third portion of said heat exchange means.

13. A method of separating at least one component from a mixture of gases comprising, passing a stream of a mixture of gases containing a desired gaseous component in heat exchange relationship in a heat exchange means with a second stream which second stream has a mass flow and a temperature of such magnitude to reduce the temperature of said mixture so that at least one gaseous component of said mixture is transformed in state with at least a portion of said transformed component remaining within said heat exchange means and with said desired component remaining in a gaseous state, subsequently discontinuing said mixture flow and said second stream flow and passing a third stream in heat exchange relationship with a fourth stream in said heat exchange means with said fourth stream having a mass flow and temperature of such magnitude so that said third stream is at a temperature in conjunction with the mass flow thereof so that substantially all of said other component in said heat exchange means is transformed in state to permit removal from said heat exchange means, subsequently discontinuing said fourth stream flow, subsequently discontinuing said third stream flow in said heat exchange means and reestablishing the initially specified flows of said mixture and said second stream, and passing at least a portion of said second and third stream flows in heat exchange relationship in other heat exchange means with at least a portion of said fourth stream flow to cause liquefaction of said portion of said fourth stream flow.

14. A method of separating at least one component from a mixture of gases comprising, passing a stream of a mixture of gases containing a desired gaseous component in heat exchange relationship in a heat exchange means with a second stream which second stream has a mass flow and a temperature of such magnitude to reduce the temperature of said mixture so that at least one gaseous component of said mixture is transformed in state with at least a portion of said transformed component remaining within said heat exchange means and with said desired component remaining in a gaseous state, subsequently substantially simultaneously discontinuing said mixture flow and said second stream flow and substantially simultaneously passing a third stream in heat exchange relationship with a fourth stream in said heat exchange means with said fourth stream having a mass flow and temperature of such magnitude so that said third stream is at a temperature in conjunction with the mass flow thereof so that substantially all of said other component in said heat exchange means is transformed in state to permit removal from said heat exchange means, subsequently discontinuing said fourth stream flow and reestablishing said second stream flow in said heat exchange means, subsequently discontinuing said third stream flow in said heat exchange means and reestablishing said mixture flow in said heat exchange means, and passing at least a portion of said second and third stream flows in heat exchange relationship in other heat exchange means with at least a portion of said fourth stream flow to cause liquefaction of said portion of said fourth stream flow.

15. A continuous method of separating at least one component from a mixture of gases comprising, passing a stream of a mixture of gases containing a desired gaseous component in heat exchange relationship in one portion of a heat exchange means with a second stream which second stream has a mass flow and a temperature of such magnitude to reduce the temperature of said mixture so that at least one gaseous component of said mixture is transformed in state with at least a portion of said transformed component remaining within said one portion of said heat exchange means and with said desired component remaining in a gaseous state, subsequently substantially simultaneously discontinuing said mixture flow and said second stream flow and reestablishing such flows in a second portion of said heat exchange means and substantially simultaneously passing a third stream in heat exchange relationship with a fourth stream in said one portion of said heat exchange means with said fourth stream having a mass flow and temperature of such magnitude so that said third stream is at a temperature in conjunction with the mass flow thereof so that substantially all of said other components in said one portion of said heat exchange means is transformed in state to permit removal from said one portion of said heat exchange means, subsequently discontinuing said fourth stream flow in said one portion of said heat exchange means and reestablishing said second stream flow in said one portion of said heat exchange means, subsequently discontinuing said third stream flow in said one portion of said heat exchange means and reestablishing said mixture flow in said one portion of said heat exchange means in heat exchange relationship with said previously reestablished second stream flow and establishing the specified flows of said third and fourth streams in said second portion of said heat exchange means, and passing at least a portion of said second and third stream flows in heat exchange relationship in other heat exchange means with at least a portion of said fourth stream flow to cause liquefaction of said portion of said fourth stream flow.

16. The method as specified in claim 1 in which said mixture and said third stream sequentially flow in opposite directions in one passageway in said heat exchange means.

17. A continuous method of separating at least one component from a mixture of gases comprising, passing a stream of a mixture of gases containing a desired gaseous component in heat exchange relationship in one portion of a heat exchange means and subsequently thereafter to a rectification column with a second stream which second stream has a mass flow and a temperature of such magnitude to reduce the temperature of said mixture so that at least one gaseous component of said mixture is transformed in state with at least a portion of said transformed component remaining within said one portion of said heat exchange means and with said desired component remaining in a gaseous state, subsequently substantially simultaneously discontinuing said mixture flow and said second stream flow and reestablishing such flows in a second portion of said heat exchange means and substantially simultaneously passing a third stream flowing from said rectification column in heat exchange relationship with a fourth stream which constitutes a portion of a stream of fluid derived from a compressor in said one portion of said heat exchange means with said fourth stream having a mass flow and temperature of such magnitude so that said third stream is at a temperature in conjunction with the mass flow thereof so that substantially all of said transformed components in said one portion of said heat exchange means is removed from said one portion of said heat exchange means and with said fourth stream being at a higher pressure than said second stream and which fourth stream is expanded in expansion means to provide the source for the major portion of said second stream, subsequently discontinuing said fourth stream flow in said one portion of said heat exchange means and reestablishing said second stream flow in said one portion of said heat exchange means, and subsequently discontinuing said third stream flow in said one portion of said heat exchange means and reestablishing said mixture flow in said one portion of said heat exchange means in heat exchange relationship with said previously reestablished second stream flow and establishing the specified flows of said third and fourth streams in said second portion of said heat exchange means.

References Cited in the file of this patent

UNITED STATES PATENTS

| | | |
|---|---|---|
| 2,534,478 | Roberts | Dec. 19, 1950 |
| 2,568,223 | De Baufre | Sept. 18, 1951 |
| 2,663,167 | Collins | Dec. 22, 1953 |
| 2,763,138 | Tsunoda | Sept. 18, 1956 |
| 2,836,040 | Schilling | May 27, 1958 |
| 2,960,836 | Haringhuizen | Nov. 22, 1960 |

FOREIGN PATENTS

| | | |
|---|---|---|
| 1,137,819 | France | Jan. 21, 1957 |